United States Patent [19]

Saito et al.

[11] Patent Number: 4,822,519
[45] Date of Patent: Apr. 18, 1989

[54] NEMATIC LIQUID CRYSTAL COMPOSITION

[75] Inventors: Hideo Saito; Shinichi Sawada, both of Yokohamashi; Kenji Furukawa, Yokosukashi, all of Japan

[73] Assignee: Chisso Corporation, Japan

[21] Appl. No.: 89,773

[22] Filed: Aug. 27, 1987

[30] Foreign Application Priority Data

Sep. 1, 1986 [JP] Japan .................. 61-205643

[51] Int. Cl.$^4$ .............. G02F 1/13; C09K 19/54; C09K 19/34; C09K 19/30
[52] U.S. Cl. .............. 252/299.61; 252/299.01; 252/299.5; 252/299.63; 252/299.66; 252/299.67; 350/350 R
[58] Field of Search ........... 252/299.01, 299.5, 299.61, 252/299.63, 299.66, 299.64, 299.65, 299.67; 250/350 R, 350 S

[56] References Cited

U.S. PATENT DOCUMENTS

| | | | |
|---|---|---|---|
| 4,405,488 | 9/1983 | Sugimori et al. | 252/299.63 |
| 4,415,470 | 11/1983 | Eidenschime et al. | 252/299.63 |
| 4,472,293 | 9/1984 | Sugimori et al. | 252/299.63 |
| 4,545,922 | 10/1985 | Eidenschink et al. | 252/299.63 |
| 4,683,078 | 7/1987 | Sugimori et al. | 252/299.61 |
| 4,695,398 | 9/1987 | Goto et al. | 252/299.63 |

FOREIGN PATENT DOCUMENTS

| | | | |
|---|---|---|---|
| 19665 | 12/1960 | European Pat. Off. | 252/299.63 |
| 59-59636 | 4/1984 | Japan | 252/299.66 |
| 59-155485 | 9/1984 | Japan | 252/299.63 |

OTHER PUBLICATIONS

Osman, M. A. et al., Mol. Cryst. Liq. Cryst., vol 82 (Letters), pp. 331-338 (1983).

*Primary Examiner*—Teddy S. Gron
*Attorney, Agent, or Firm*—Leydig, Voit & Mayer

[57] ABSTRACT

A nematic liquid crystal composition whose threshold voltage is scarcely influenced by temperature changes is provided, which composition comprises at least two components at least one of which is a compound expressed by the formula

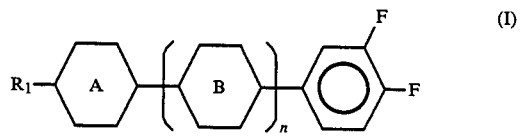

wherein $R_1$ represents an alkyl group or an alkoxy group each of 1 to 10 carbon atoms,

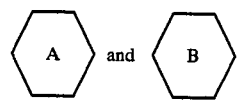

each independently represent a benzene ring or a cyclohexane ring and n represents an integer of 0 or 1, said compound being contained in 10 to 100% by weight in said composition.

4 Claims, 2 Drawing Sheets

NEMATIC LIQUID CRYSTAL COMPOSITION

BACKGROUND OF THE INVENTION

1. Field of the Invention

This invention relates to a liquid crystalline composition and also to a TN type liquid crystal display element, and more particularly it relates to a liquid crystalline composition having an improved threshold voltage, temperature dependency (hereinafter often abbreviated to Vth) of display elements.

2. Description of the Related Art

In recent years, as the performance of liquid crystal display devices has improved, their fields of applications have also been extended. Liquid crystal displays during their earlier stages of development had been used mainly for handy type electric calculators, watches, clocks, etc. due to the specific feature of low power consumption of the displays. Recently, however, as liquid crystal materials have been developed, applications of liquid crystal display devices have come to be rapidly expanded in various fields such as those of outdoor display devices or instrumental panels for automobiles having broad service temperature ranges or those of large scale displays such as hand-held computors, computor terminal equipment, etc.

When this is viewed from the driving mode of display elements, the mode has been transferred from the static driving mode of watches, etc. at the earlier stages to the multiplex driving mode of $\frac{1}{2}$ to $\frac{1}{4}$ duty, etc. as in the case of electric calculators, etc. by which the capacity of information display is increased. At present, the driving mode has come to be transferred from 1/16 duty to 1/64 duty or a higher multiplex driving mode by which word processors as well as graphic displays are effected.

In the case of such a high multiplex driving mode, an operational restriction which does not occur at all in the case of the static driving mode is present in principle. Namely, in the voltage-levelling method generally employed in the multiplex driving mode, crosstalk at a half-selected or unselected element is liable to occur; and moreover, the higher the multiplexing of the driving mode becomes, the less the allowance of the operation voltage i.e. the operation margin becomes and the more liable the crosstalk is to occur.

The following three factors affect the operation margin in a highly multiplexed display:

(1) temperature dependency of threshold voltage,
(2) viewing angle dependency of threshold voltage and
(3) steepness of voltage-brightness characteristic.

Among these factors, factor (2) depends on the product of the optical anisotropy value ($\Delta n$) of liquid crystal materials by the cell gap (d) of display elements (the value of $\Delta n \times d$), and factor (3) also depends greatly on the cell constitution of a TN type LCD; hence it is difficult to effect a notable difference by way of the materials.

Whereas as to the factor (1), the influence of the materials thereon is greatest since the operation temperature range of display elements is also related thereto. In order to improve factor (1), such a countermeasure directed to liquid crystal materials themselves is mentioned that by increasing the proportion of a liquid crystal component having a negative dielectric anisotropy value (hereinafter often abbreviated to $\Delta\epsilon$), the temperature dependency of the threshold voltage is reduced (see Japanese patent application laid-open No. Sho 54-83694/1979). However, even when such liquid crystal materials are used, reduction in the dependency has not been to such an extent that the voltage margin is effected in a narrow range of 0° to 40° C. under $\frac{1}{2}$ to $\frac{1}{4}$ duty so that it has been difficult to secure the voltage margin over a broad temperature range. In other words, there is a limitation to such a method of increasing the content of liquid crystal components having negative $\Delta\epsilon$ to thereby reduce the temperature dependency of the threshold voltage due to liquid crystal materials; thus an effectiveness with a leap cannot be expected.

In the case of TN type display elements, it has been quite usually carried out to add a slight quantity of an optically active substance called a chiral dopant thereto and thereby determine the twist sense of liquid crystal molecules within a cell to suppress the reverse twist of the liquid crystal molecules and thus keep constant the display grade of the TN type liquid crystal display elements. When an optically active substance is added as above, the resulting nematic liquid crystals form a helical structure. The driving threshold voltage of TN type display elements is influenced by the helical intrinsic pitch of the liquid crystal materials used for the elements when the cell thickness and the temperature are constant.

Japanese patent application laid-open No. Sho 55-38869/1980 discloses such a liquid crystal mixture that when a right-twisted helical, optically active substance and a left-twisted helical, optically active substance are added in certain proportions to a nematic liquid crystal, reduction in the threshold voltage on the higher temperature side is prevented and also the temperature dependency thereof is reduced. In the above reference, a liquid crystal material is diclosed which makes the temperature dependency of the threshold voltage zero in the range of 0° to 40° C. However, such a mode using chiral dopants consisting of two components having opposite helical twist senses has the following problems:

(1) A temperature at which the twist sense is reversed is inevitably present. In general, there is a substance which is liable to cause a reverse twist on the lower temperature side, while forming 270° twist on the higher temperature side.
(2) Further, since right-twisted and left-twisted, optically active substances whose twist senses are offset to each other are mixed together, addition thereof in small quantities elongates the intrinsic pitch; hence in order to obtain a desired intrinsic pitch P, increase in the quantities of the optically active substances added is by all means compelled. Thus, the nematic phase temperature range and viscosity of the original nematic liquid crystal, and the specific features of the resulting liquid crystal display element such as threshold voltage Vth, etc. are considerably varied. In particular, this has a bad influence upon the steepness of voltage-brightness characteristic, and since the viscosity also generally rises due to increase in the amount of chiral dopants, there is a tendency that the response time of the liquid crystal cell is prolonged.
(3) When expensive optically active substances as compared with usual nematic liquid crystals are added in large quantities, the ultimate liquid crystal composition also becomes considerably expensive.

Accordingly, such a mode using two chiral dopants for opposite twist senses has not been employed so much. Thus, for practical use, one is compelled to employ a means of imparting a temperature-compensating function to the driving circuit for LCD to thereby control the voltage impressed to the liquid crystal cell.

As described above, while it has been earnestly desired to reduce the temperature dependency of the threshold voltage originated from nematic materials themselves, conventional materials which can reduce the temperature depenceny of Vth over a broad temperature range have been scarcely present.

SUMMARY OF THE INVENTION

As apparent from the foregoing, the object of the present invention is to provide a liquid crystal composition having an improved threshold voltage temperature dependency over a broad temperature range. It is naturally required for the liquid crystal composition of the present invention that various characteristics required for the conventional nematic liquid crystal materials such as liquid crystal phase temperature range, viscosity, dielectric anisotropy (hereinafter often abbreviated to $\Delta\epsilon$), optical anisotropy (hereinafter often abbreviated to $\Delta n$), threshold voltage, response properties, etc. are well balanced.

The present inventors have made extensive research on nematic liquid crystal materials and have found a liquid crystal material whose threshold voltage is scarcely influenced by temperature change.

The present invention in a first aspect resides in (1) a nematic liquid crystal composition comprising at least two components at least one of which is a compound expressed by the formula

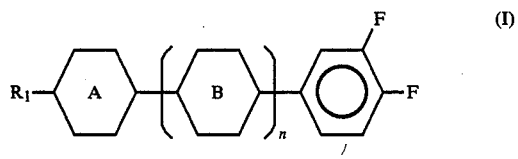

wherein $R_1$ represents an alkyl group or an alkoxy group each of 1 to 10 carbon atoms,

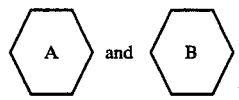

each independently represent a benzene ring or a cyclohexane ring and n represents an integer of 0 or 1, the compound being contained in 10 to 100% by weight in the composition.

The present invention in a second aspect resides in (2) a nematic liquid crystal composition comprising as a first component [A], at least one member of compounds expressed by the formula

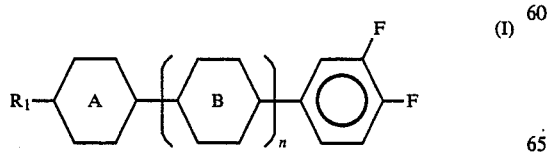

wherein $R_1$ represents an alkyl group or an alkoxy group each of 1 to 10 carbons atoms,

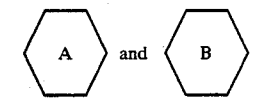

each independently represent a benzene ring or a cyclohexane ring and n represents an integer of 0 or 1, the first component being contained in 10 to 80% by weight in the composition, and as a second component, at least one member of the following components [B], [C] and [D], these components being each singly contained in 5 to 50% by weight in the said composition:

the component [B] consisting of at least one member of compounds having a high dielectric anisotropy value of $\Delta\epsilon \geq 5$ wherein $\Delta\epsilon$ represents a dielectric anisotropy value, except for the compounds of the formula (I), the component [C] consisting of at least one member of liquid crystal compounds having a low dielectric anisotropy value of $|\Delta\epsilon| < 5$, and the component [D] consisting of at least one member of liquid crystal compounds having a clearing point higher than 100° C.; and (3) a nematic liquid crystal composition according to item (2) wherein the component [B] comprises at least one member of compounds expressed by the formulas (B1) to (B7) listed below, said component [C] comprises at least one member of compounds expressed by the formulas (C1) to (C11) listed below and said component [D] comprises at least one member of compounds expressed by the formulas (D1) to (D10) listed below:

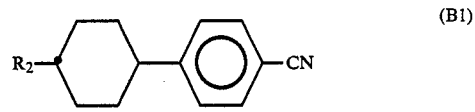
(B1)

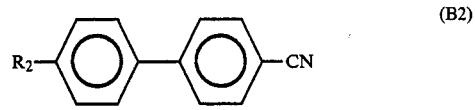
(B2)

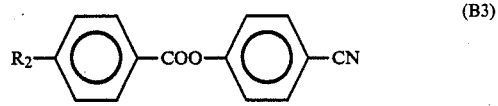
(B3)

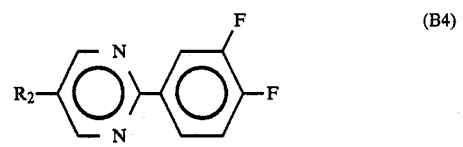
(B4)

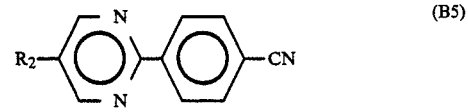
(B5)

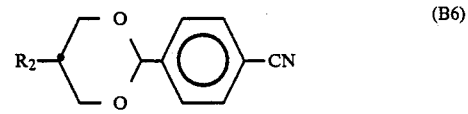
(B6)

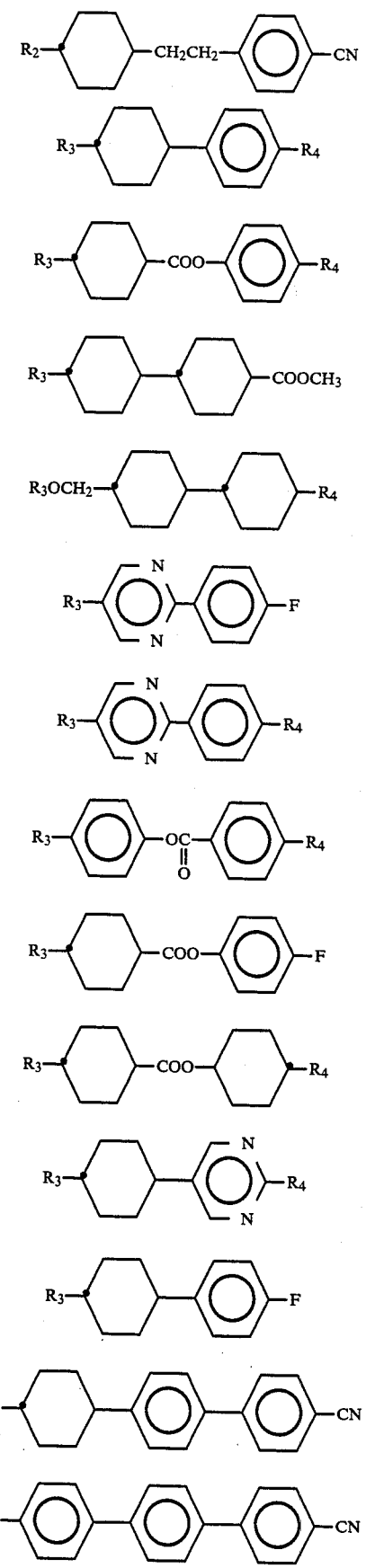

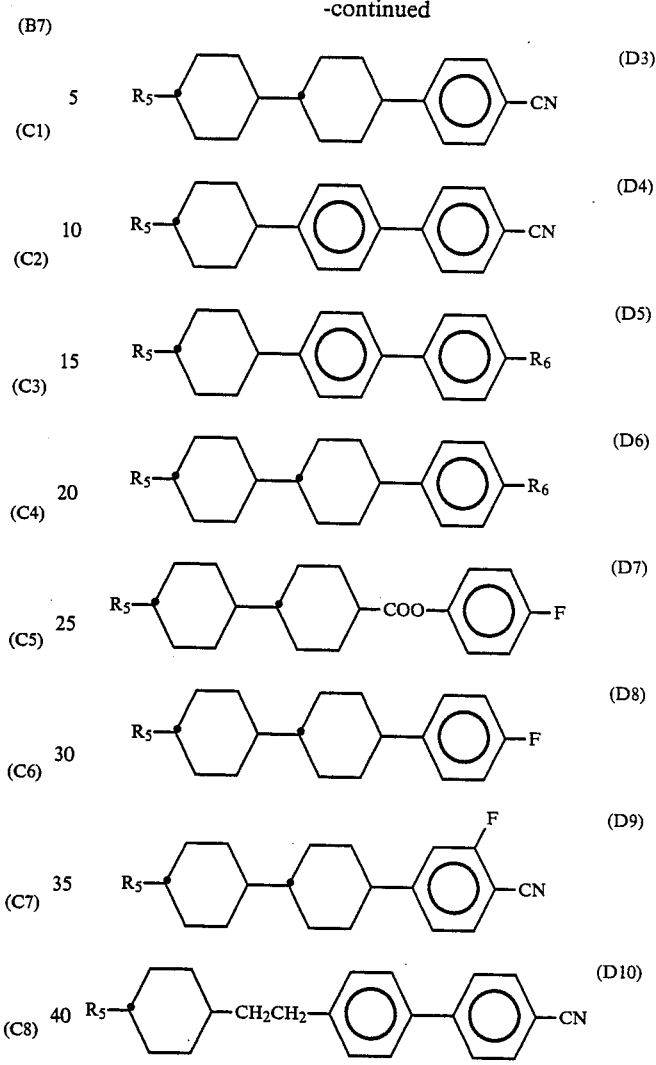

wherein $R_2$ represents an alkyl group or an alkoxy group each of 1 to 8 carbon atoms, $R_3$ represents an alkyl group of 1 to 8 carbon atoms, $R_4$ represents an alkyl group or an alkoxy group each of 1 to 10 carbon atoms, $R_5$ represents an alkyl group of 1 to 8 carbon atoms and $R_6$ represents an alkyl group or an alkoxy group each of 1 to 8 carbon atoms.

DETAILED DESCRIPTION OF PREFERRED EMBODIMENTS

The compound expressed by the formula

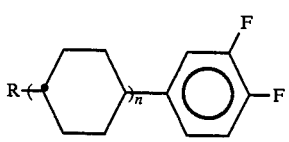

Figure 1:
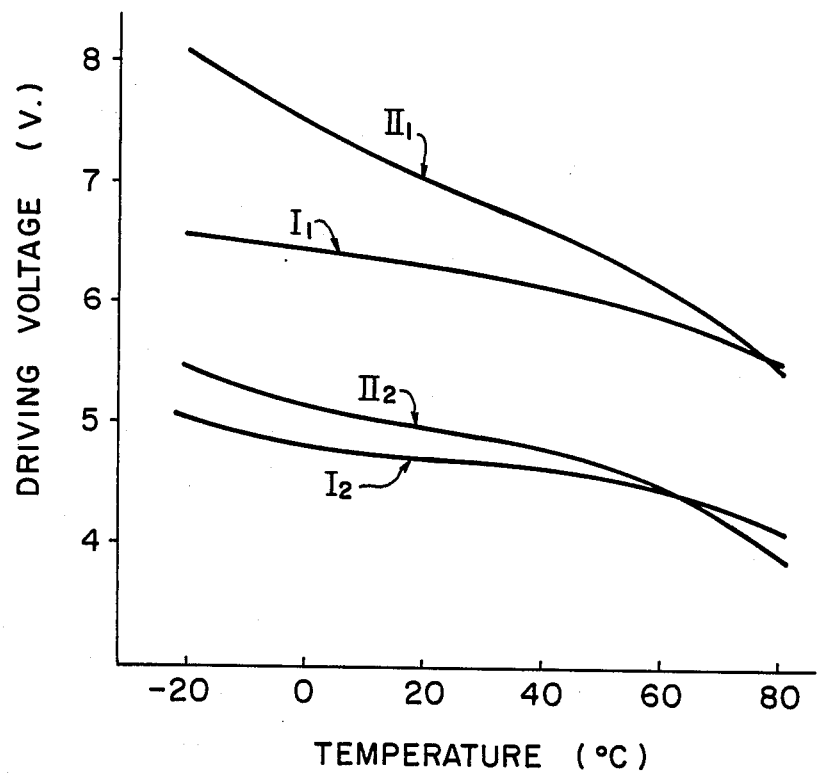
FIG. 1 shows a chart illustrating the voltage-temperature characteristic at the time of multiplex drive.

wherein R represents an alkyl group of 1 to 10 carbon atoms and n represents 1 or 2, and used as a component in the present invention, may be prepared according to the process disclosed in Japanese patent application laid-open No. Sho 57-154135/1982 and Japanese patent application laid-open No. Sho 61-207347/1986.

Further, the compound expressed by the formula

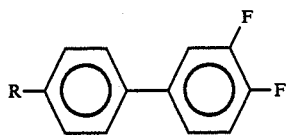

wherein R represents an alkyl group or an alkoxy group each of 1 to 10 carbon atoms, disclosed in Japanese patent application laid-open No. Sho 59-59636/1984.

Preparations of these compounds may be briefly described as follows:

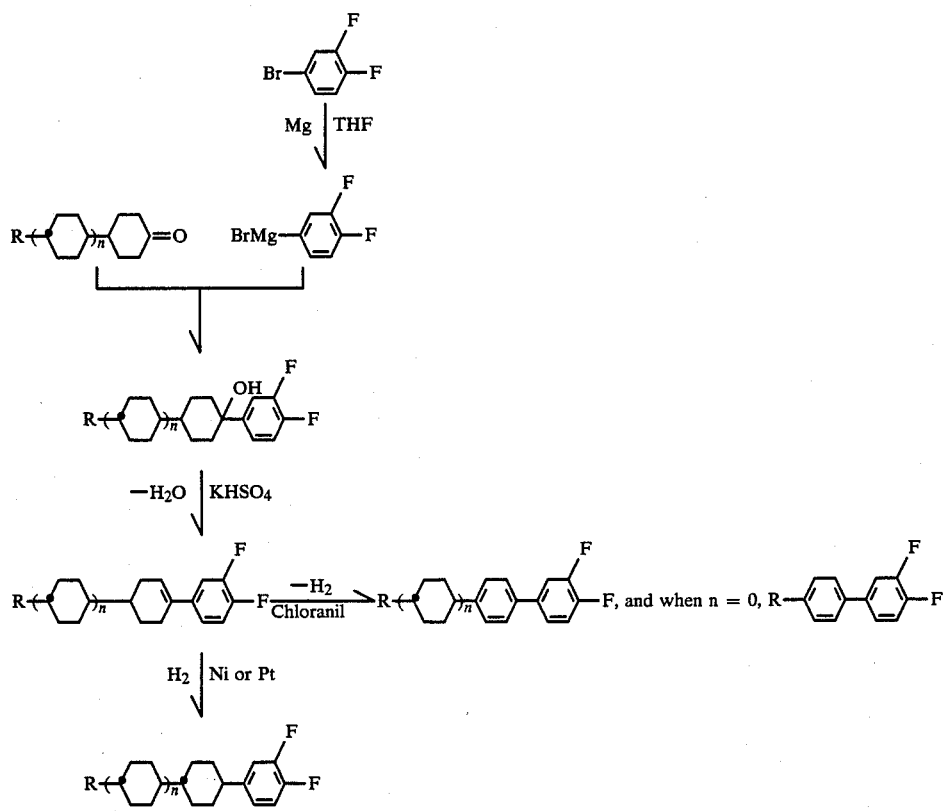

The compounds used as the components B, C and D are known compounds.

Further, preparation of the composition of the present invention may be carried out by mixing the components in an isotropic liquid phase.

When the compound of the formula (I) is used as a component of nematic materials, the compound is very effective for reducing the temperature dependency of the threshold voltage thereof (hereinafter often abbreviated to Vth). As shown in Example 1 described later, nematic materials consisting only of the compounds of the formula (I) are typically observed to afford nearly equal threshold voltages in a temperature range of 0° to 60° C. to thereby contribute to improvement in the temperature dependency thereof. However, if the content of the component [A] consisting of the compound of the formula (I) is less than 10% by weight, the effectiveness of improving the temperature dependency of the threshold voltage of nematic liquid crystal materials is insufficient. Thus, the compound of the formula (I) may be contained in 10% by weight or more in a range where other various specific features required for desired liquid crystal materials are not damaged.

Most of the compounds of the formula (I) are liquid crystal compounds and have a positive, relatively large dielectric anisotropy value. Among the compounds of the formula (I) wherein $n=0$, some compounds exhibit no liquid crystal phase, but when these compounds are used as a component of liquid crystal mixtures, they function as if they were a liquid crystal component having a positive dielectric anisotropy value, and also function as a component for reducing the temperature dependency of Vth.

The $\Delta\epsilon$ values of the component compounds in the present invention mean the extrapolation values obtained as follows:

The $\Delta\epsilon$ value of a composition consisting of three compounds of the formula (B1) wherein $R_2$ represents propyl, pentyl and heptyl, in quantities of 30, 40 and 30 parts by weight, respectively, is taken as a standard value; the $\Delta\epsilon$ value of a mixture with the composition of the three compounds as a standard is observed at 25° C.; and from the observed value is calculated the extrapolation value, presuming that additivity come into existence relative to the resulting $\Delta\epsilon$ value.

The second invention described in the above items (2) and (3) refers to a liquid crystal composition having suitably harmonized the specific features required for nematic liquid crystal materials such as $\Delta\epsilon$, viscosity, mesomorphic temperature range, etc., and also having an improved threshold voltage temperature voltage over a broad temperature range.

In the second aspect of the invention, the component [B] is a component for enhancing the Δε of the resulting composition and used in at most 50% by weight. If the content of the component [B] exceeds 50% by weight, rise in the viscosity of the composition and reduction in the clearing point thereof are liable to occur; hence such excess is undesirable in the aspect of balance of the specific features.

The component [C] is a liquid crystal component effective for reducing the viscosity of the composition, and used in at most 50% by weight. If the content of the component [C] exceeds 50% by weight, rise in the Vth is notable; hence such excess is unsuitable.

The component [D] is a high temperature liquid crystal effective for broadening the nematic phase region of the composition toward the higher temperature side, and used similarly in at most 50% by weight. If the content of the component [D] exceeds 50% by weight, rise in the lower limit temperature of the nematic phase is liable to occur; hence such excess is also undesirable.

For effectively using these components [B], [C] and [D], it is preferred to make the respective contents of these components 5% by weight or higher. In the foregoing, as to the components [B], [C] and [D], explanation has been made as if only their main specific features were made use of, but other specific features of these component compounds as well as various specific features which have been known based on experience to be obtained by mixing these, can, of course, be made use of.

In the composition of the present invention, slight quantity additives such as chiral dopant, viscosity depressant, pleochroic dyestuff, etc. which have been used in conventional liquid crystal mixtures may be added.

The nematic liquid crystal composition provided by the present invention is a liquid crystal material having a small absolute value of the temperature dependency of the threshold voltage (d Vth/dt) over a broad temperature range. When the nematic composition is used, it is possible to obtain a voltage margin in multiplex drive over a broad temperature range. Further, it is also possible to omit the temperature-compensating circuit which has so far been considered to be necessary for instruments employing multiplex drive loaded on cars, outdoor displays, etc.

Further since the compound of the component [A] has a low viscosity for a large Δε of 5 to 8, it is possible to reduce the content of liquid crystal of a positive Δε generally having a relatively high viscosity. In this case, a multiplex drive at low threshold voltages and a high speed response are possible.

The compound expressd by the formula (I) has an optical anisotropy value as small as around 0.08. Thus, it has become possible according to the present invention to provide a liquid crystal material having a small Δn and a low Vth, as shown in Examples described later. As is well known, since a liquid crystal material having a small Δn improves the specific feature of angle of view, the material can increase the margin of operating voltage in combination with the effect of reducing the temperature dependency of Vth.

Further, as to the nematic composition shown in Example 9, while its nematic range is not broadened toward its higher temperature side, since its Vth is low and its temperature dependency is small, a multiplex drive is realized at an electric source voltages of 1.5 V and ½ duty without using any temperature-compensating circuit.

The present invention will be described in more detail by way of Examples, but it should not be construed to be limited thereto. Measurement of Vth was carried out with a cell obtained by using a composition in a TN cell having a polyimide-film aligned by rubbing and having a cell thickness of 9 μm, and by determining the impressed voltage at a brightness value of 10% in an impressed voltage-brightness relation at various temperatures. Table 1 shows the value of Vth at 25° C. Further the value of the temperature dependency of threshold voltage is given by the following equation:

$$\frac{dVth}{dt}(t_1 \sim t_2) = \frac{Vth(t_1) - Vth(t_2)}{t_1 - t_2} \times 1000 \text{ (mV/°C.)}$$

In the above equation, Vth ($t_1$) and Vth ($t_2$) represent the respective values of the threshold voltage (V) at temperatures $t_1$ and $t_2$ (°C.).

In the following Examples, "parts" and "%" mean "parts by weight" and "% by weight", respectively.

EXAMPLE 1

The following three kinds of liquid crystal compounds belonging to the formula (I) were mixed in equal weights, respectively to prepare a nematic liquid crystal composition (A-1):

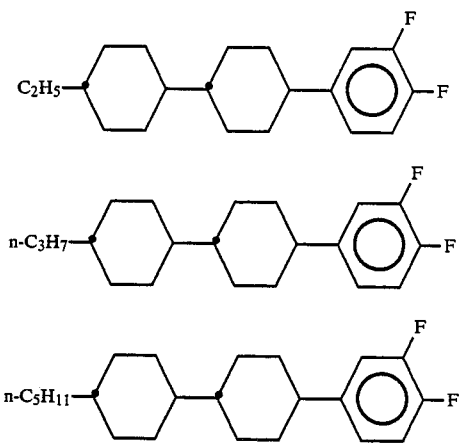

The clearing point, viscosity, optical anisotropy value, threshold voltage and temperature dependency of threshold voltage of the above composition are shown in Table 1.

EXAMPLE 2

A nematic liquid crystal composition consisting of the following components was prepared:

as the component [A],
composition (A-1) prepared in Example 1     24 parts
as the component [B], 8 parts

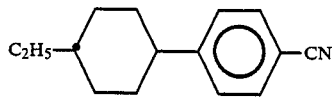

n-C₃H₇—⬡—⌬—CN    2 parts as the component [C], n-C₃H₇—⬡—⌬—OC₂H₅    14 parts liquid crystal composition (N-1) consisting of components mentioned later    6 parts CH₃OCH₂—⬡—⬡—n-C₃H₇    5 parts and as the component [D], C₂H₅—⬡—⬡—⌬—CH₃    6 parts n-C₃H₇—⬡—⬡—⌬—CH₃    7 parts n-C₃H₇—⬡—⬡—⌬—n-C₃H₇    14 parts n-C₃H₇—⬡—⬡—⌬—OCH₃    4 parts n-C₃H₇—⬡—⬡—COO—⌬—F    3 parts n-C₅H₁₁—⬡—⬡—COO—⌬—F    3 parts n-C₃H₇—⬡—⬡—⌬—F    4 parts.

The specific features of the resulting composition are shown in Table 1.

The above-mentioned composition (N-1) is a composition consisting of the following 5 kinds of liquid crystals having a negative $\Delta\epsilon$:

n-C₃H₇—⬡—COO—⌬—OC₂H₅    17% n-C₃H₇—⬡—COO—⌬—OC₄H₉(n-)    27% n-C₄H₉—⬡—COO—⌬—OCH₃    21% n-C₄H₉—⬡—COO—⌬—OC₂H₅    21% n-C₅H₁₁—⬡—COO—⌬—OC₂H₅    14%

COMPARATIVE EXAMPLE 1

As a liquid crystal material having almost the same use object as that of the composition prepared in Example 2, a conventional composition consisting of the following components wherein the contents of liquid crystals having a negative $\Delta\epsilon$ are increased is shown for comparison:

n-C₃H₇—⬡—⌬—CN    8 parts n-C₅H₁₁—⬡—⌬—CN    10 parts n-C₃H₇—⬡—⌬—OC₂H₅    7 parts composition (N-1)    12 parts n-C₃H₇—⬡—⬡—COOCH₃    10 parts n-C₅H₁₁—⬡—⬡—COOCH₃    8 parts C₂H₅—⬡—⬡—⌬—CH₃    5 parts n-C₃H₇—⬡—⬡—⌬—F    5 parts

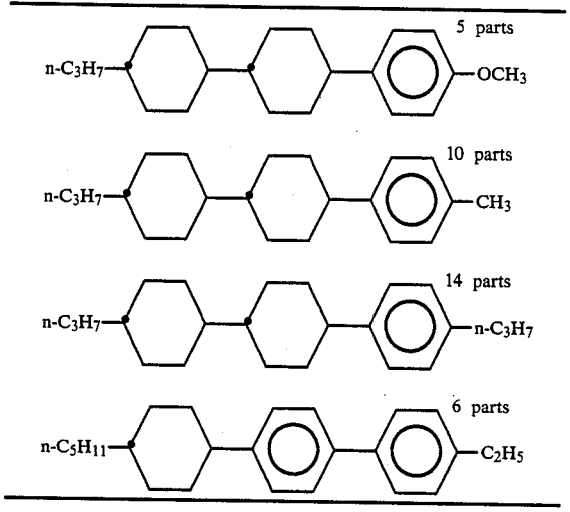

The first and second components in the above composition belong to the component [B] of the present invention; the succeeding 4 components belong to the component [C] of the present invention; and the remaining 6 components belong to the component [D] of the present invention. The specific features of this nematic liquid crystal composition are shown in Table 1.

Next, the composition prepared in Example 2 and the composition shown in Comparative example 1 were respectively used at a multiplex drive under ⅓ duty and ½ bias. Comparison data obtained at that time are shown in FIG. 1.

In this figure, curves I₁ and II₁ each represent voltage characteristics at a non-selected element (OFF region) under a brightness of 10% and an angle of view of 40°, and curves I₂ and II₂ each represent voltage characteristics at a selected element (ON region) under a brightness of 50% and an angle of view of 10°. The symbol I means the results of Example 2 and the symbol II means the results of Comparative example 1.

In the case of the composition of Comparative example 1 (curves II₁ and II₂), it is impossible to determine an operating voltage under which the difference between ON and OFF can be effected within a broad temperature range of −20° to +80° C. at a multiplex drive under ⅓ duty and ½ duty bias. Namely, curves II₁ and II₂ illustrate that an operating voltage is absent under which a selected element is driven at −20° C., while a non-selected element is not driven at 80° C.

On the other hand, in the case of the composition of Example 2 (curves I₁ and I₂), it is seen from FIG. 1 that an operating voltage can be set within a certain range of driving voltage in which a selected element is driven at −20° C. but a non-selected element is not driven at 80° C.

Namely, when a liquid crystal material is used at a multiplex drive under ⅓ duty and ½ bias within a broad temperature range of −20° to +80° C., the voltage margin is zero in the case of the composition of Comparative example 1, whereas there is a voltage margin of about 0.4 V in the case of the composition of Example 2; hence the material is sufficiently operable.

EXAMPLE 3

A nematic liquid crystal composition consisting of the following components was prepared:

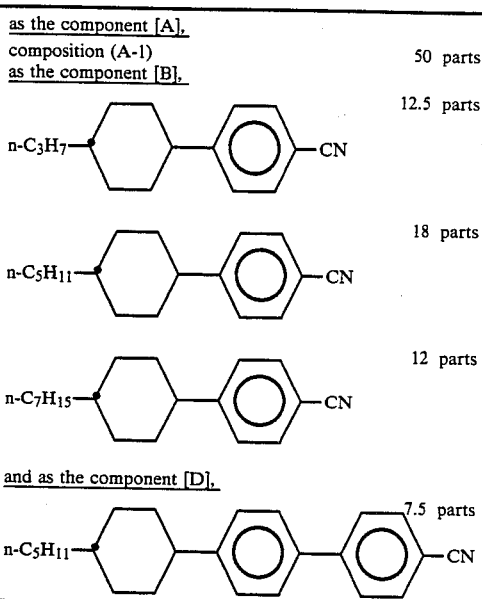

The specific features of the composition are shown in Table 1.

EXAMPLE 4

A nematic liquid crystal composition consisting of the following components was prepared:

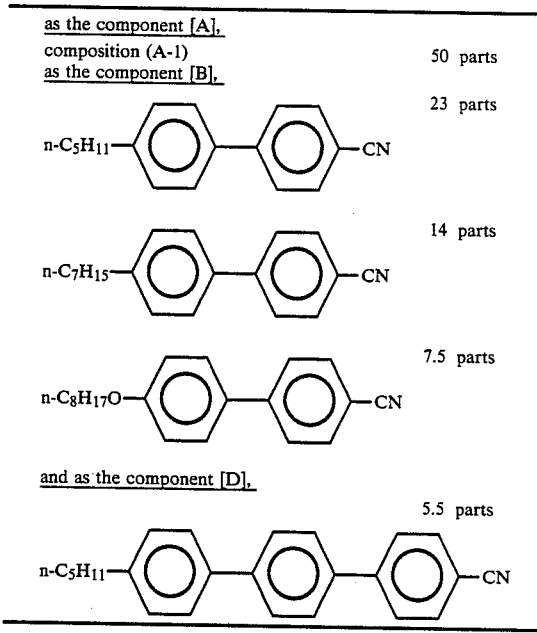

The specific features of the composition are shown in Table 1.

COMPARATIVE EXAMPLES 2 AND 3

In order to confirm the effect of the component [A], compositions having excluded only the component [A] from the composition of Example 3 and that of Example 4, respectively, i.e. compositions consisting only of the components [B] and [D] were prepared. The specific features of these compositions are shown in Table 1.

It is seen from comparison of these Examples with these Comparative examples that when the component [A] is added, the respective absolute values of d Vth/dt (0° to 40° C.) and d Vth/dt (0° to 60° C.) are reduced by about 40%. Further, these Examples indicate that even when a liquid crystal component of $\Delta\epsilon<0$ is not used, it is possible to make the absolute value of d Vth/dt about 5 mV/°C.

Figure 2:
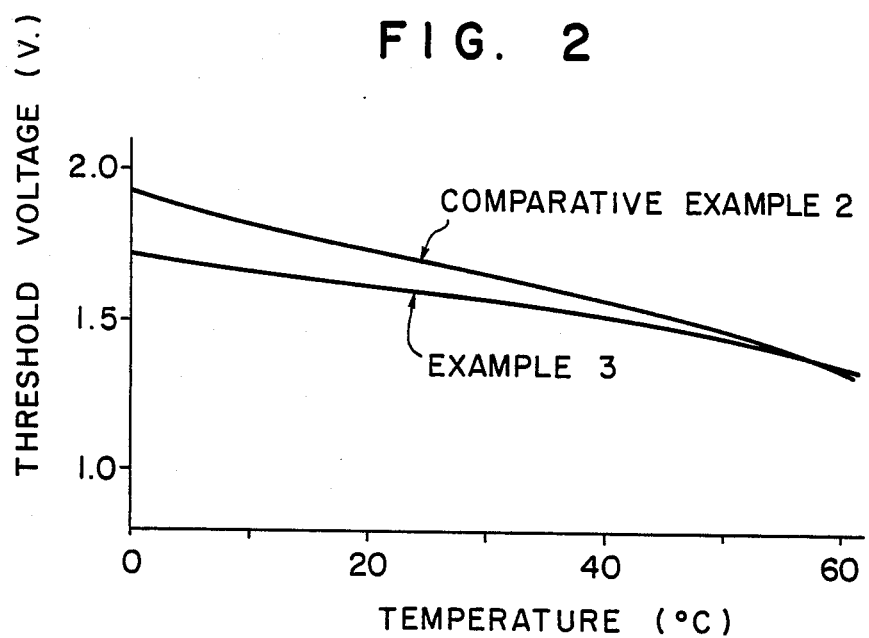
FIGS. 2 and 3 each show a chart illustrating the temperature dependency of the threshold voltage at the time of static drive.
Figure 3:
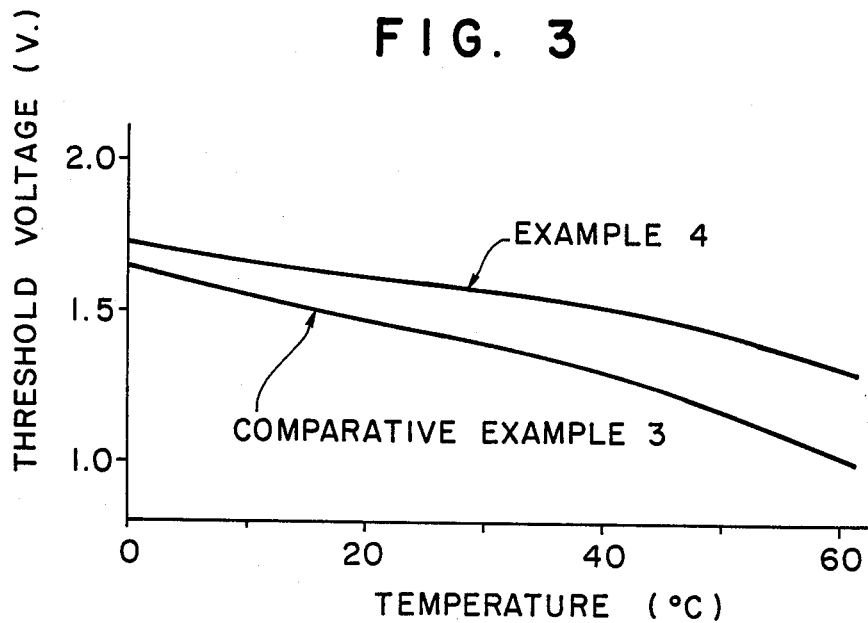

FIG. 2 illustrates the respective temperature dependencies of Vth of Example 3 and Comparative example 2 and FIG. 3 illustrates those of Example 4 and Comparative example 3.

EXAMPLE 5

A nematic liquid crystal composition consisting of the following components was prepared:

as the component [A],
composition (A-1)     40 parts as the component [B],
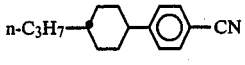
10 parts as the component [C],
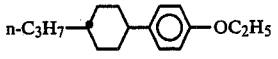
10 parts composition (N-1)     20 parts
and as the component [D],
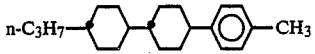
5 parts

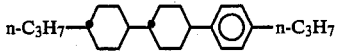
15 parts

The specific features of this composition are shown in Table 1.

EXAMPLE 6

A nematic liquid crystal composition consisting of the following components was prepared:

as the component [A],
composition (A-1)     50 parts as the component [C],
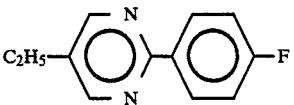
15 parts and as the component [D],
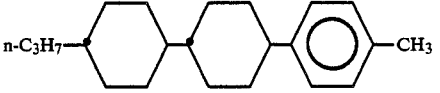
6 parts

11 parts

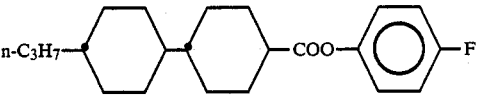
6 parts

6 parts.

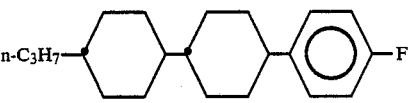

The specific features of the composition are shown in Table 1.

EXAMPLE 7

A nematic liquid crystal composition consisting of the following components was prepared:

as the component [A],
composition (A-1)     45 parts

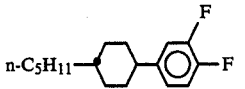
5 parts as the component [B],
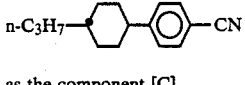
10 parts as the component [C],
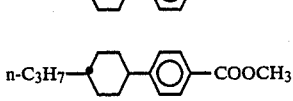
7 parts

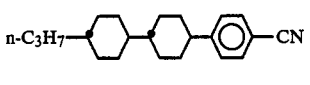
3 parts and as the component [D],
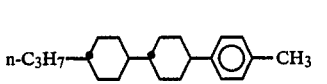
4 parts

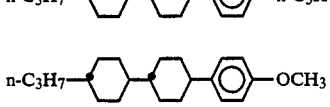
4 parts

[additional structures]
4 parts 10 parts 4 parts 4 parts.

The specific features of the composition are shown in Table 1.

EXAMPLE 8

A nematic liquid crystal composition consisting of the following components was prepared:

as the component [A],

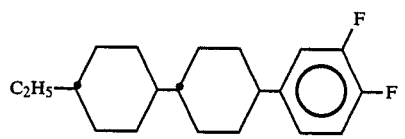
13 parts

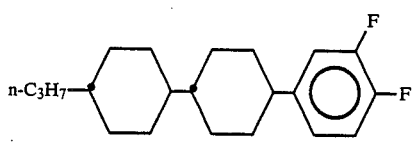
15 parts as the component [B],

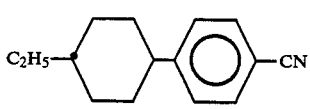
12 parts

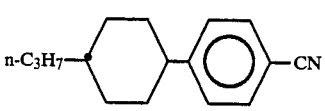
10 parts

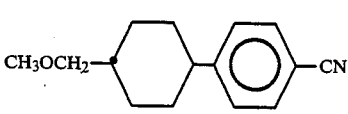
6 parts

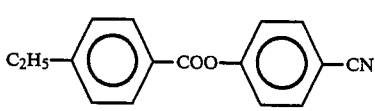
6 parts as the component [C],
a mixture of the following three kinds of pyrimidine derivatives in equal quantities:

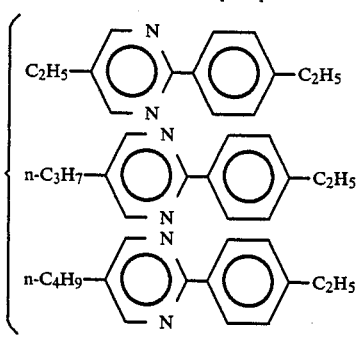
8 parts and as the component [D],

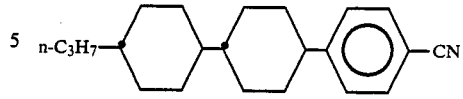
6 parts

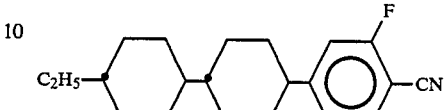
12 parts

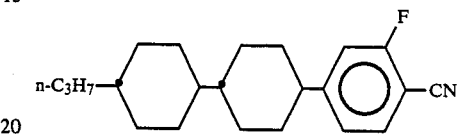
12 parts.

The specific features of the composition are shown in Table 1.

EXAMPLE 9

A nematic liquid crystal composition consisting of the following components was prepared:

as the component [A],

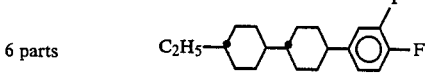
10 parts

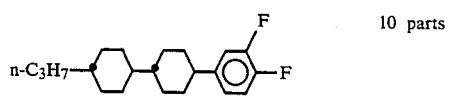
10 parts

16 parts as the component [B],

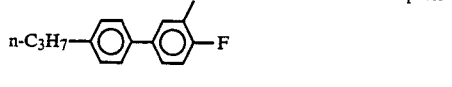
22 parts

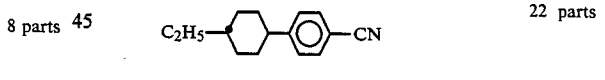
12 parts and as the component [D],

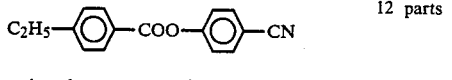
15 parts

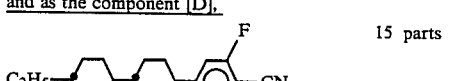
15 parts

The specific features of the composition are shown in Table 1.

TABLE 1

| Specific feature | Example and Compar. ex. | | | | | | | | | | | |
|---|---|---|---|---|---|---|---|---|---|---|---|---|
| | Ex. 1 | Ex. 2 | Ex. 3 | Ex. 4 | Ex. 5 | Ex. 6 | Ex. 7 | Ex. 8 | Ex. 9 | Comp. ex. 1 | Comp. ex. 2 | Comp. ex. 3 |
| Clearing point (°C.) | 108.8 | 107.1 | 85.7 | 77.4 | 95.7 | 106.8 | 104.2 | 93.1 | 62.9 | 100.9 | 72.5 | 63.0 |

TABLE 1-continued

| Specific feature | Example and Compar. ex. | | | | | | | | | | | |
|---|---|---|---|---|---|---|---|---|---|---|---|---|
| | Ex. 1 | Ex. 2 | Ex. 3 | Ex. 4 | Ex. 5 | Ex. 6 | Ex. 7 | Ex. 8 | Ex. 9 | Comp. ex. 1 | Comp. ex. 2 | Comp. ex. 3 |
| Viscosity (20° C.) (cP) | 27.8 | 19.1 | 26.1 | 30.5 | 21.2 | 20.6 | 19.3 | 33.6 | 36.1 | 20.1 | 28.0 | 45.0 |
| $\Delta_n$ | 0.083 | 0.093 | 0.106 | 0.159 | 0.091 | 0.098 | 0.087 | 0.138 | 0.113 | 0.097 | 0.140 | 0.235 |
| Vth (25° C.) (V) | 2.11 | 3.18 | 1.60 | 1.59 | 2.66 | 2.41 | 2.47 | 1.54 | 1.05 | 3.18 | 1.70 | 1.43 |
| $\frac{dVth}{dt}$ (mV/°C.) | | | | | | | | | | | | |
| (0~40° C.) | 0.0 | −5.0 | −4.8 | −5.3 | −5.0 | −4.2 | −3.2 | −3.0 | −4.3 | −9.0 | −8.8 | −8.5 |
| (0~60° C.) | −0.50 | −6.5 | −6.0 | −6.8 | −6.8 | −5.5 | −4.2 | −4.0 | | −11.0 | −9.5 | −10.3 |
| (−20~60° C.) | | −6.0 | −5.8 | −6.5 | −6.5 | −5.1 | −3.6 | −3.5 | −4.5* | −10.5 | −9.3 | −9.9 |

(Note)
The value having a symbol * is a value at −20° to 40° C.

What we claim is:
1. A nematic liquid crystal composition comprising, by weight, 10 to 80% of at least one compound of a component having the formula

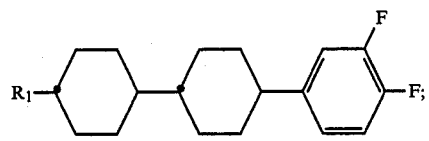  (A1)

5 to 50% of a component (B) comprising at least one member of the group consisting of the compounds expressed by the formulas (B1) to (B7)

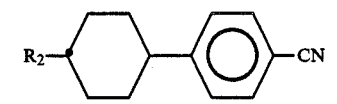  (B1)

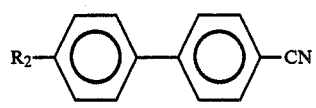  (B2)

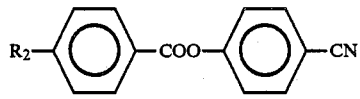  (B3)

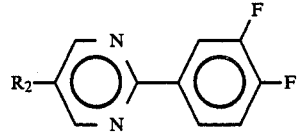  (B4)

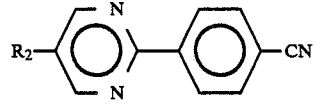  (B5)

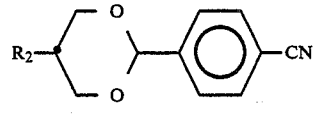  (B6)

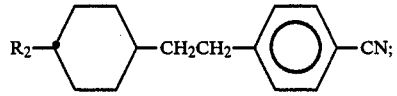  (B7)

5 to 50% of a component (C) comprising at least one member of the group consisting of the compounds expressed by the formulas (C1) to (C11)

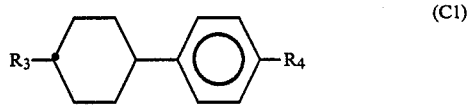  (C1)

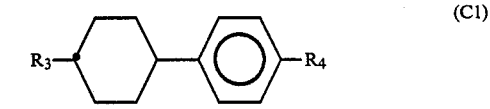  (C2)

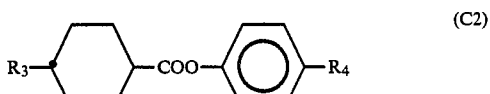  (C3)

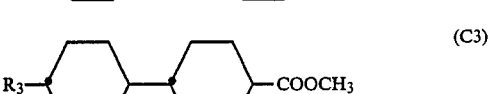  (C4)

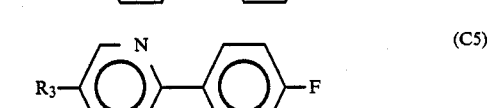  (C5)

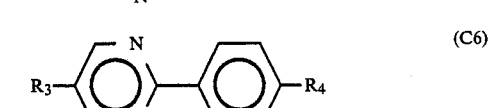  (C6)

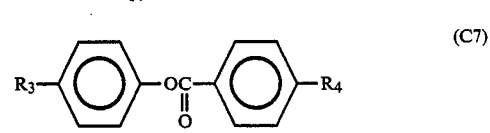  (C7)

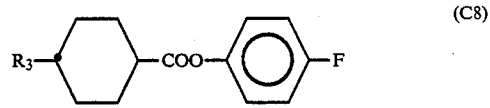  (C8)

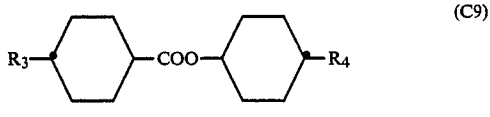  (C9)

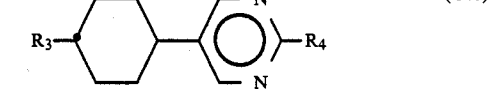  (C10)

-continued

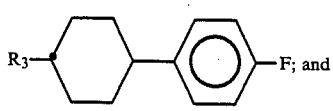 (C11)

5 to 50% of a component (D) comprising at least one member of the group consisting of the compounds expressed by the formulas (D1) to (D10)

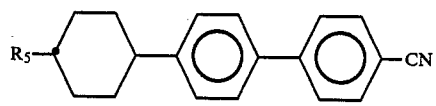 (D1)

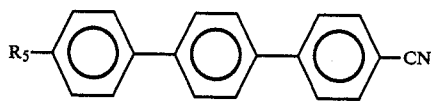 (D2)

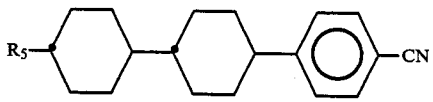 (D3)

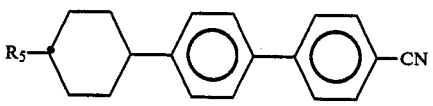 (D4)

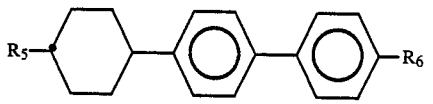 (D5)

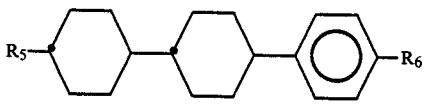 (D6)

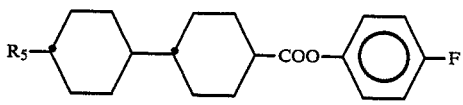 (D7)

-continued

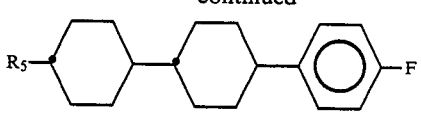 (D8)

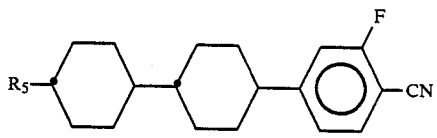 (D9)

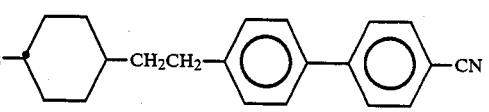 (D10)

wherein $R_1$ and $R_4$ each independently represents an alkyl group or an alkoxy group of 1 to 10 carbon atoms and $R_2$, $R_3$, $R_5$, and $R_6$ each independently represents an alkyl group or an alkoxy group of 1 to 8 carbon atoms.

2. A nematic liquid crystal composition according to claim 1 wherein said compound is

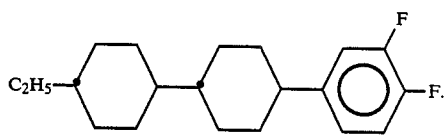

3. A nematic liquid crystal composition according to claim 1 wherein said compound is

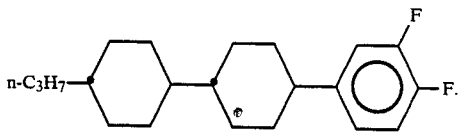

4. A nematic liquid crystal composition according to claim 1 wherein said compound is

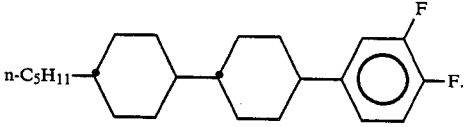

* * * * *